(12) United States Patent
Kao et al.

(10) Patent No.: US 6,224,705 B1
(45) Date of Patent: May 1, 2001

(54) SPECIAL PROCESS FOR MANUFACTURING MULTI-LAYERED FLAT ADHESIVE TAPE

(75) Inventors: Cheng-Kang Kao, Taipei; David Lin, Hsinchung; Sung-Nien Chang, Yi-Lan Hsien, all of (TW)

(73) Assignee: Four Pillars Enterprises Corp., Taipei Hsien (TW)

( * ) Notice: Subject to any disclaimer, the term of this patent is extended or adjusted under 35 U.S.C. 154(b) by 0 days.

(21) Appl. No.: 09/276,782

(22) Filed: Mar. 25, 1999

(51) Int. Cl.[7] ............................................. B32B 31/00
(52) U.S. Cl. .................. 156/196; 156/184; 156/185; 156/252; 156/289; 206/411
(58) Field of Search .................... 206/411; 156/527, 156/185, 184, 196, 252, 289

(56) References Cited

U.S. PATENT DOCUMENTS

| | | | |
|---|---|---|---|
| 3,006,464 | * 10/1961 | Snell | 206/411 |
| 4,729,518 | * 3/1988 | Mathna et al. | 156/527 |
| 5,269,421 | * 12/1993 | Taylor | 206/411 |
| 5,763,038 | * 6/1998 | Wood | 428/43 |
| 6,077,577 | * 6/2000 | Spatorico et al. | 428/34.1 |

FOREIGN PATENT DOCUMENTS

| | | |
|---|---|---|
| 2214450 | * 9/1989 | (GB) . |
| 57-180570 | * 11/1982 | (JP) . |
| 9-58743 | * 3/1997 | (JP) . |

* cited by examiner

Primary Examiner—Jeff H. Aftergut
(74) Attorney, Agent, or Firm—Jiawei Huang; J.C. Patents

(57) ABSTRACT

A process for manufacturing a flat adhesive tape comprises: providing a stiff interfacial sheet having a flat and solid form; surrounding the stiff interfacial sheet with a plurality of adhesive layers so as to form a roll of the adhesive layers with the stiff interfacial sheet positioned on a symmetric plane of the roll; and compressing the roll to form the flat adhesive tape. The stiff interfacial sheet can have a length slightly longer than a half-length of an innermost circumference of the roll of the adhesive layers. A layer of high adhesion material containing uncured high cross-linking epoxy or uncured high cross-linking cyanoacrylate can be provided between the stiff interfacial sheet and the adhesive layers. After compressing the roll of the adhesive layers, the high adhesion material is cured to form the flat adhesive tape.

38 Claims, 6 Drawing Sheets

SPECIAL PROCESS FOR MANUFACTURING MULTI-LAYERED FLAT ADHESIVE TAPE

BACKGROUND OF THE INVENTION

1. Field of the Invention

The invention relates in general to special process for manufacturing multi-layered adhesive tapes, wherein the multi-layered adhesive tapes are easily portable adhesive tapes capable of saving space for convenient carrying.

2. Description of the Related Art

Conventional adhesive tapes usually are designed with circular inner core, such as paper core, plastic core or similar core. Recent developments have led to the flat adhesive tapes 12. Hollow orthogonal flat plastic tubes are made by ejection molding or hollow square flat paper tubes are designed by bending card board, as reference number 10 shows in FIG. 1. Adhesive tape is then unwounded out from jumbo roll and slitted into a desired tape. The tubes 10 are individually winded up into the flat adhesive tapes 12. However, such a manufacturing method requires a long working time and higher cost. Moreover, this kind of flat adhesive tape cannot provide necessary special physical properties, for example, super-transparence and coherence, due to the occurrence of trapped bubbles when the adhesive tapes are individually winded up.

If the conventional adhesive tapes are compressed directly to become the flat adhesive tapes, the inner tubes are distorted and the outside surface of the adhesive tapes is deformed by applied stress. Moreover, a strong rebound force remains in the distorted material, for example, the tube and tape. The more distortion occurs in a short time, the more rebound force there is. Besides, due to intrinsic properties such as visco-elasticity and memory of the substrate and adhesive layer of the adhesive tape structure, after the compression stress is removed the relaxation of the structure accompanied by a rebound force drive the adhesive tape to a stable state. The rebound force drives the adhesive tape to regain the tape's original shape. The strength of the rebound force depends on the deformation degree on the each position of the adhesive tape. The strength of the rebound force further depends on the thickness of the substrate, mechanical strength of the substrate, physical properties of the adhesive layer, adhesion, total length, central length of the symmetric plane (internal diameter before performing the compression step), and the winding up tension of the adhesive tape.

SUMMARY OF THE INVENTION

The manufacturing process of the easily portable and multi-layered adhesive tape of the present invention is suitable for flatting any adhesive tape and capable of automatic production and manufacturing a high quality flat adhesive tape.

The easily portable and multi-layered adhesive tape, that is a flat adhesive tape, of the present invention is mainly made by flatting the non-flat and multi-layered adhesive tape having a circular shape or other shapes. During the flatting process, the non-flat and multi-layered adhesive tape is compressed and cohered symmetrically, or a stiff interfacial layer having or lacking high adhesion property is inserted before the non-flat and multi-layered adhesive tape is compressed. The existence of the stiff interfacial layer produces an extending force along the symmetric plane of the easily portable flat adhesive tape. This extending force partially diminishes the rebound force, which causes the deformation of the flat adhesive tape. If the total length of the flat adhesive tape is not very long, the rebound force is not very large, either. Therefore, the non-flat adhesive tape without a paper core can be compressed and cohered directly through both innermost adhesive surfaces or a stiff and solid interfacial layer located in the innermost portion of the flat adhesive tape, so that a beautiful and easily portable flat adhesive tape is formed. The stiff and solid interfacial layer is, for example, adhesive, cardboard, plastic plate, metal slice, or combination, or the like. When the strength of the flat adhesive tape is increased using, for example, a substrate with a high mechanical strength, thus increasing the thickness of the substrate, increasing the total tape length, or reducing the inner diameter, the rebound force is also increased. Under such circumstances, a layer of high adhesion material can be applied to the symmetric plane of the adhesive tape. The layer of high adhesion material is, for example, high cross-linking density thermoset epoxy adhesive or cyanoacrylate adhesive for ensuring the symmetric cohesion of the innermost portion of the flat adhesive tape. After solidification, the cross-linking material not only provides adhesion functionality but also provides an extension force for sustaining the flat adhesive tape and partially offsetting the rebound force. Of course, if the high cross-linking density adhesive material is combined with the stiff interfacial layer, the rebound force is further offset, and the stability of the flat adhesive tape is therefore increased.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

First Preferred Embodiment

Figure 1:
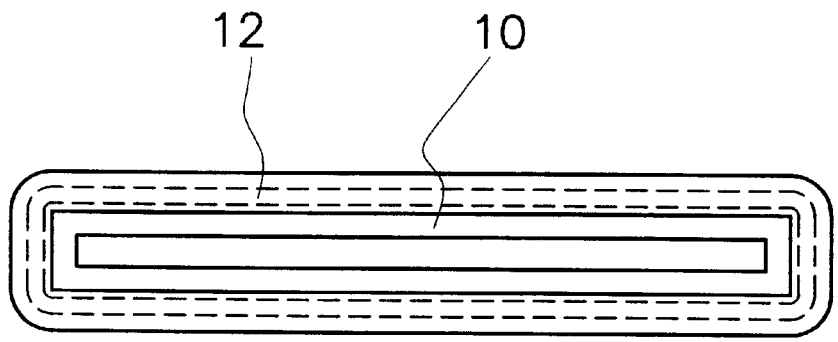
FIG. 1 is a schematic, cross-sectional view showing a conventional adhesive tape with a paper core and a plastic core having a hollow orthogonal shape.
Figure 2A:
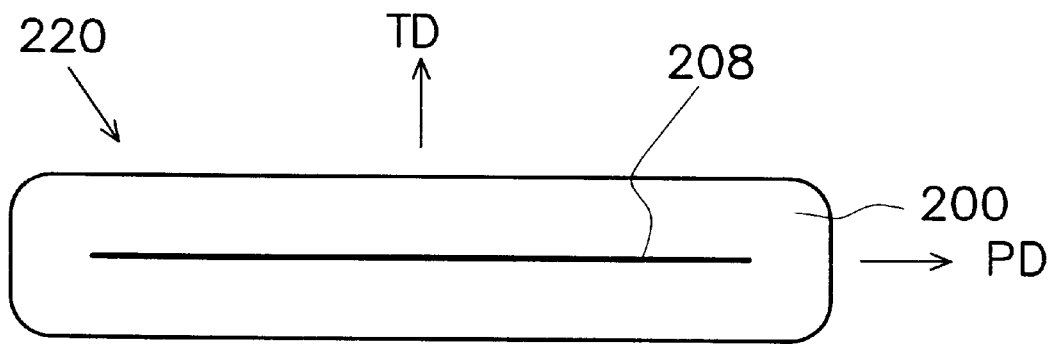
FIG. 2A is a schematic, cross-sectional view showing an flat adhesive tape that has no paper core or plastic core according to a first preferred embodiment of the present invention.
Figure 2B:
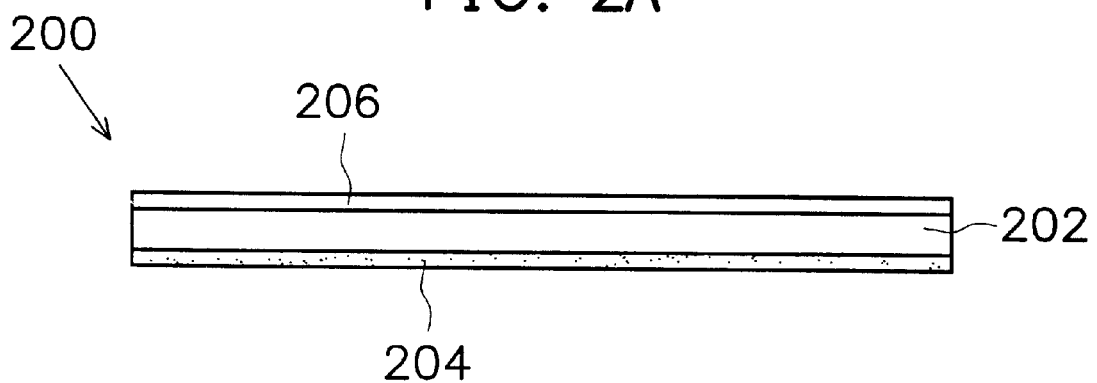
FIG. 2B is a diagram showing a schematic, cross-sectional view of the flat adhesive tape showing in FIG. 2A.

FIGS. 2A to 2B are schematic, cross-sectional views showing the flat adhesive tape of the first preferred embodiment of the present invention.

Referring to 2B, an adhesive tape 200 having a substrate 202, a releasing layer 206 and an adhesive layer 204 is provided. The adhesive tape 200 described hereafter denotes an unwinded adhesive tape. The substrate 202 is composed of, for example, paper, synthetic paper, clothes, nonwoven, plastic film, embossed plastic film, or materials with similar property, wherein the plastic film is composed of, for example, Polypropylene (PP), Polyethylene Terephthalate (PET), Polyethylene (PE), Polyethylene Naphthalate (PEN), Polyimide (PI), Polyvinylchloride (PVC) or the like. In the present invention, the preferred substrate 202 can also be a metal foil, for example, copper foil, aluminum foil, a copper foil with silver plating on a single side or both sides thereof, or tin, chromium, nickel or gold plated copper foil. Furthermore, the substrate 202 can be a composite film consisting of above mentioned metal foils and plastic films. An adhesive layer 204 is formed on one side of the substrate 202, and a releasing layer 206 is formed on the other side of the substrate 202. The adhesive tape 200 is then winded up to be a semifinished, cordless and multi-layered adhesive tape with a given length and diameter. The semifinished, cordless and multi-layered adhesive tape is then cut into several multi-layered adhesive tapes with adequate width. These multi-layered adhesive tapes are then compressed into a flat shape. The letters TD indicate a transverse direction, which is perpendicular to the symmetric plane in the flat adhesive tape 220 which is multi-layered (hereafter the flat adhesive tape denotes a multi-layered flat adhesive tape). The letters PD indicate a parallel direction, which is parallel to the symmetric plane in the flat adhesive tape 220. The symmetric flat adhesive tape 220 is formed by compressing and self-cohering the innermost surface of the adhesive layer on the symmetric plane 208, as shown in FIG. 2A.

Second Preferred Embodiment

Figure 3:
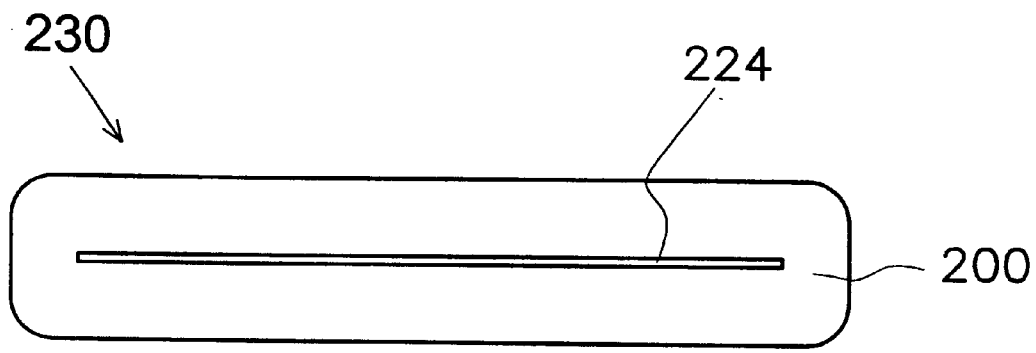
FIG. 3 is a schematic, cross-sectional view showing the flat adhesive tape having a high-adhesion layer in the plane of symmetry the flat adhesive tape shown in FIG. 2.

A high-adhesion layer 224 is further placed in the symmetric plane 208 of the flat adhesive tape 220 without paper cores, as described in the first embodiment. The preferred material of the high-adhesion layer 224 is high cross-linking adhesive, for example, epoxy adhesive, cyanoacrylate adhesive etc. The flat adhesive tape 230 is then formed after the compressing and cohering steps are performed, as shown in FIG. 3. The cyanoacrylate or epoxy adhesives on the symmetric plane is cured and becomes a stiff interfacial layer 224 after the cyanoacrylate or epoxy adhesives cured. This stiff interfacial layer 224 partially eliminates the rebound force causing the deformation.

Third Preferred Embodiment

Figure 4:
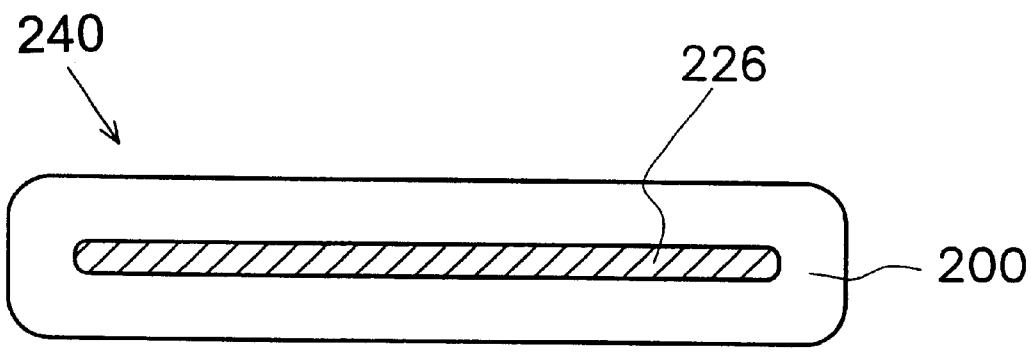
FIG. 4 is a schematic, cross-sectional view showing the flat adhesive tape having a stiff layer in the plane of symmetry plane of the flat adhesive tape shown in FIG. 2.

The stiff interfacial layer 226 may be placed in the symmetric plane of the flat adhesive tape 220 without a paper core, as described in the first embodiment, before the compressing step is performed. The preferred interfacial layer 226 has a length equal to or a little longer than the half-length of the innermost circumference of the adhesive tape without paper core. The length of the interfacial layer 226 can be longer than the half-length of the innermost circumference of the adhesive tape because of the existing of the adhesive layer's coherent and extended properties. The flat adhesive tape 240 is formed, as shown in FIG. 4, after the compressing step is performed. The stiff interfacial layer 226 is a flat and solid layer, and is composed of, for example, Polyethylene, Polypropylene, Polystyrene, Polyester, Polycarbonate, Polyvinyl Chloride (PVC), Acrylonitrile-Butadiene-Styrene (ABS), metal etc. The preferred material of the interfacial layer 226 is plastic or metal having high surface energy and polarity. Therefore, the partial rebound force caused by deformation is diminished by making the innermost surface of the cordless adhesive tape adhere to opposite surfaces of the stiff interfacial layer. Since it is not easy to separate the innermost surface of the adhesive tape from the surfaces of the interfacial layer, the flat shape of the adhesive tape is maintained.

Fourth Preferred Embodiment

Figure 5:
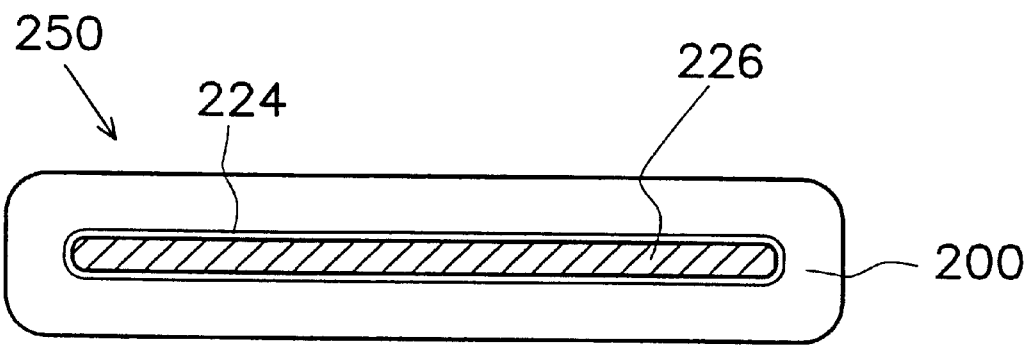
FIG. 5 is a schematic, cross-sectional view showing the flat adhesive tape having a high-adhesion layer and a stiff layer on the symmetry plane of the flat adhesive tape showing in FIG. 2.

The stiff interfacial layer 226 having a high adhesive property on its outer surface may be placed in the symmetric plane of the flat adhesive tape 240 without a paper core, as described in the third preferred embodiment, before the compressing step is performed. For example, a layer of adhesive layer 224 is coated on the outer surface of the stiff interfacial layer 226 followed by placing the stiff interfacial layer 226 in the symmetric plane of the adhesive layer 224. A flat adhesive tape 250 is then formed after a compressing step is performed on the adhesive layer, as shown in FIG. 5. The adhesive layer 224 is composed of material, for example, epoxy adhesive, cyanoacrylate adhesive etc., having a high cross-linking density property after curing.

Fifth Preferred Embodiment

Figure 6:
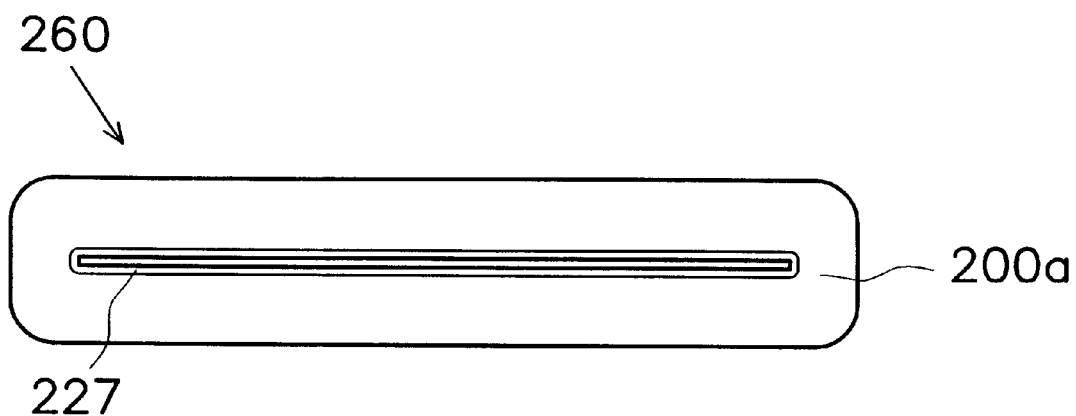
FIG. 6 is a schematic, cross-sectional view showing the flat adhesive tape having a paper or a plastic film, wherein there is a high-adhesion layer located in the plane of symmetry plane of the flat adhesive tape.

FIG. 6 is a schematic, cross-sectional view showing the flat adhesive tape according the fifth preferred embodiment of the present invention.

The adhesive structure in FIG. 6 is the same as FIG. 2B, so the description of the adhesive structure is omitted. The adhesive tape is multi-layer winded to a predetermined length and diameter, and a semi-finished product having one layer of material 227 on the innermost surface of the adhesive tape is obtained. The layer of material 227 can be a paper, synthetic paper, clothes, nonwoven, plastic, embossed plastic, metal etc. The semi-finished product is then cut into an adhesive tape 200a with a predetermined width. A layer of high-adhesion material or double-sided adhesive tape is then placed on between the surface of the paper layers or one plastic layers before the compressing step is performed on the semi-finished product. The preferred high-adhesion material is the adhesive material, for example, epoxy adhesive, cyanoacrylate adhesive etc., having high cross-linking density property after curing, wherein the cyanoacrylate adhesive and epoxy adhesive has high and rapid cross-linking properties. The adhesive tape having a circular or non-circular shape is then compressed into flat adhesive tape 260 with flat shape.

Figure 7:
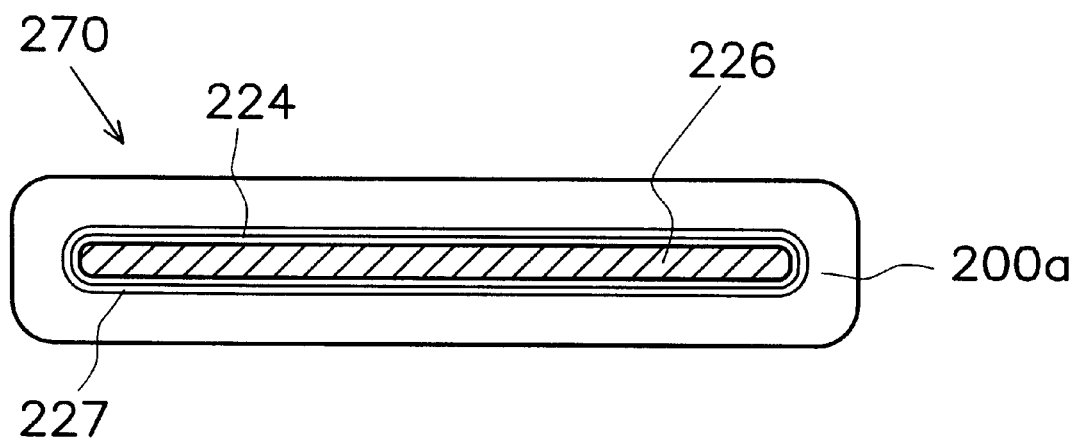
FIG. 7 is a schematic, cross-sectional view showing the flat adhesive tape having a high-adhesion layer and a stiff layer in the plane of symmetry of the flat adhesive tape shown in FIG. 6.
Figure 8A:
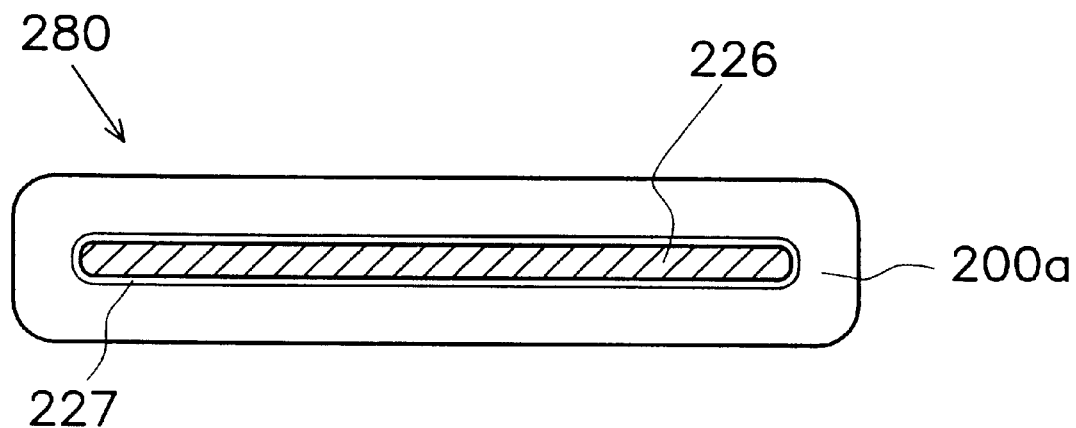
FIG. 8A is a schematic, cross-sectional view showing the flat adhesive tape having a stiff layer in the plane of symmetry of the flat adhesive tape shown in FIG. 6.

Furthermore, a layer of interfacial layer having high adhesion, for example, a stiff interfacial layer 226 coated by a layer of high adhesion material 224, can also be placed on the symmetric plane of adhesive tape 260 before the compressing step is performed. The flat adhesive tape 270, as shown in FIG. 7, is formed after the compressing step is performed. The interfacial layer 226 without coating with high adhesion material can be used instead of the interfacial layer coating with high adhesion material. The interfacial layer 226 can extend and flatten the adhesive tape along the plane of symmetry. This makes the adhesive tape become the flat adhesive tape 280, wherein the interfacial layer 226 has a length longer than or equal to the half-length of the innermost circumference of the adhesive tape, as shown in FIG. 8A.

Figure 8B:
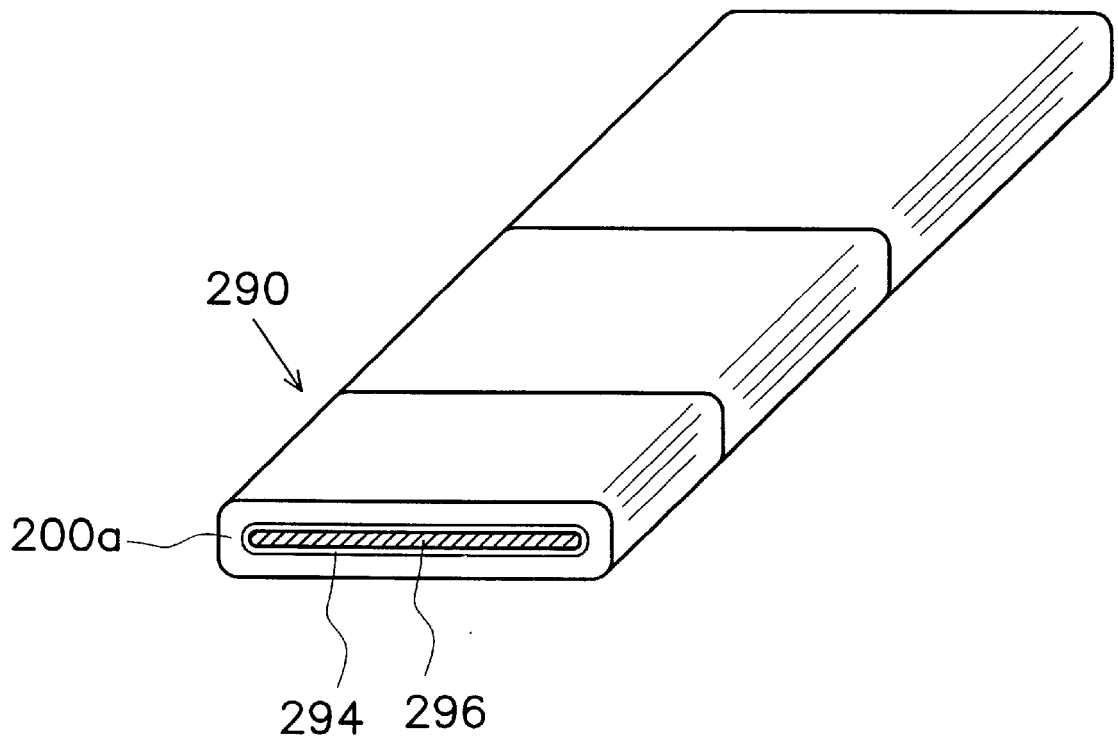
FIG. 8B is a schematic, side view showing the flat adhesive tapes with different width, wherein the flat adhesive tapes are arranged in a row.

Moreover, several adhesive tapes with different width could be arranged in a row before the adhesive tapes are compressed. A stiff interfacial layer 296 is applied to the central space, that is the plane of symmetry, within all the adhesive tapes, wherein the stiff interfacial layer 296 is, for example, coated with a layer of high adhesion material 294. The adhesive tapes are then compressed for forming the easily portable adhesive tapes 290, wherein the adhesive tapes 290 are arranged in a row, as shown in FIG. 8B.

Figure 9:
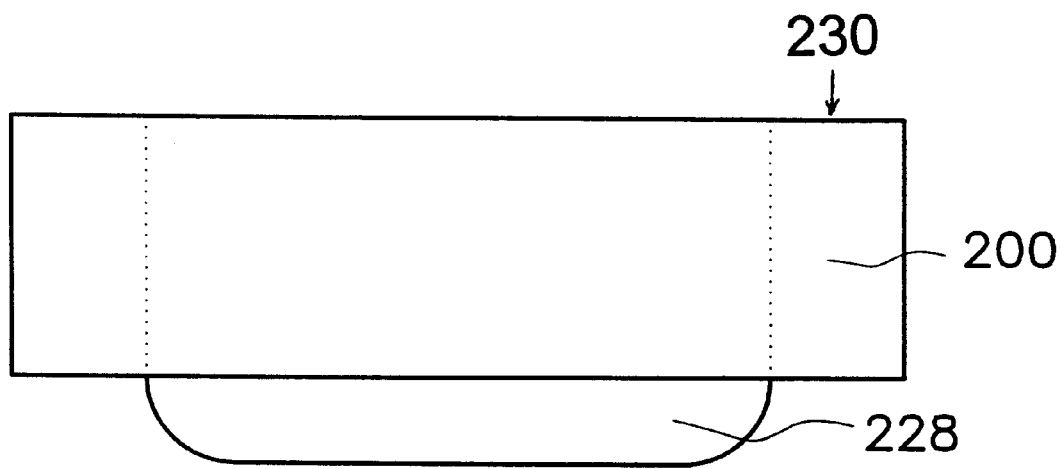
FIG. 9 is a schematic, top view showing the flat adhesive tape having a stiff layer in the plane of symmetry of the flat adhesive tape, wherein the stiff layer is wider than the adhesive tape.

Furthermore, a stiff interfacial layer 228 wider than the width of the adhesive tape can be utilized in the symmetry plane of the adhesive tape for adding the Trademark of the company or product on the flat adhesive tape, especial on the opaque adhesive tape. The Trademark of the company or product is marked on the extension portion of the stiff interfacial layer 228, which protrudes from the adhesive tape. If the stiff interfacial layer 228 is not coated with adhesive material, then the length of the stiff interfacial layer 228 should be longer than or equal to the half-length of the innermost circumference of the adhesive tape, as shown in FIG. 9. Of course, an adhesive layer (not shown) can be applied to the outside surface of the stiff interfacial layer 228 for diminishing partial rebound force, which caused the deformation of the flat adhesive tape 230.

Figure 10:
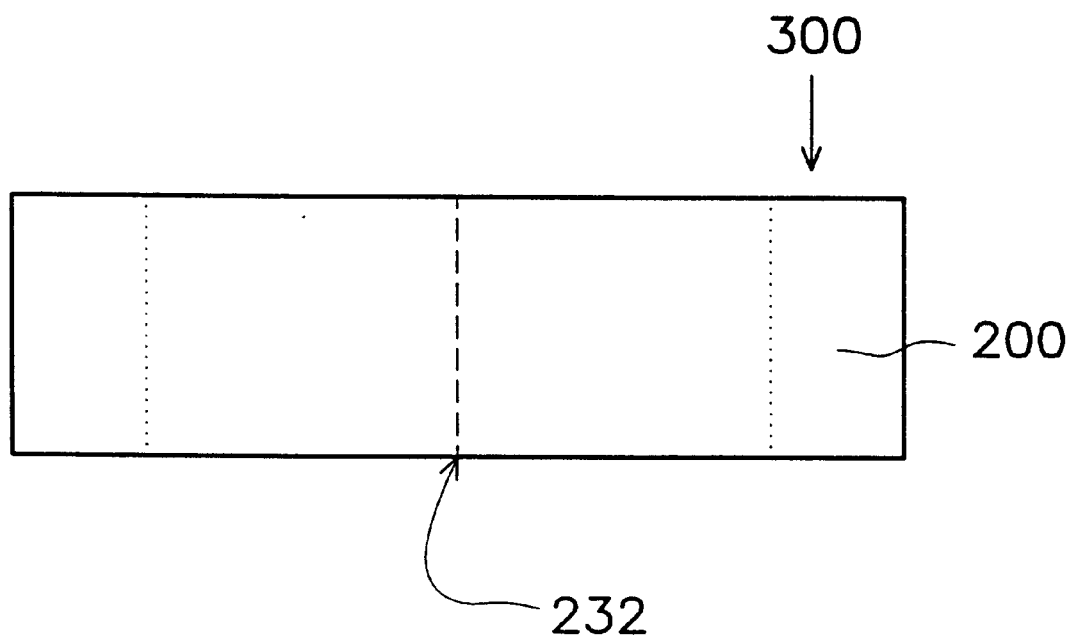
FIG. 10 is a schematic, top view showing the flat adhesive tape having perforations holes.
Figure 11:
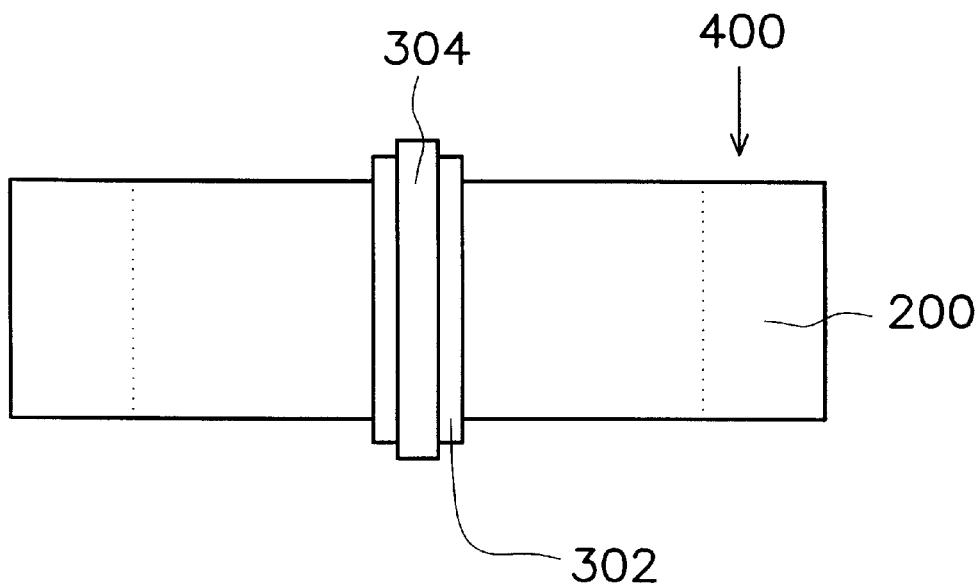
FIG. 11 is a schematic, top view showing the flat adhesive tape having a binder and a safe cutter.
Figure 12:
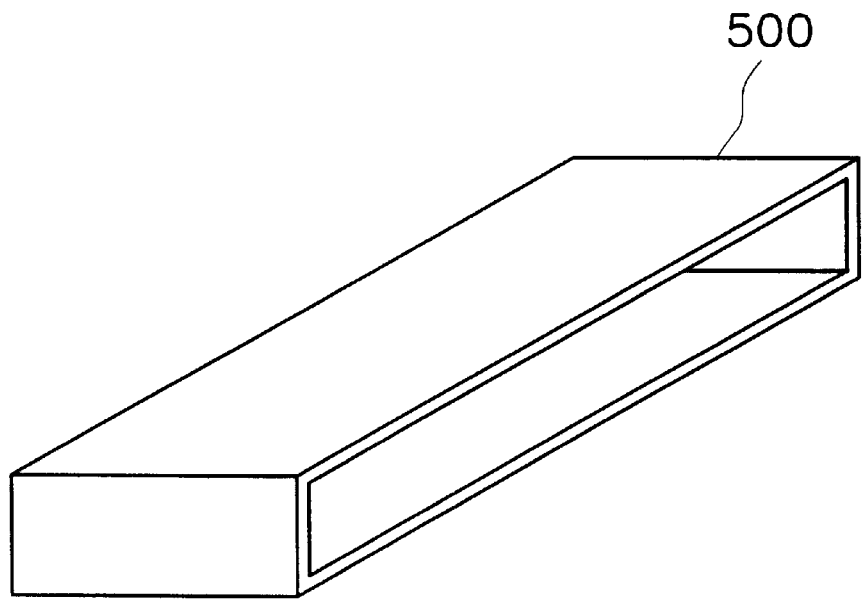
FIG. 12 is a schematic, side view showing the container for storing the flat adhesive tape.

For easy use, perforations 232 can be drilled along the width, the first to fifth preferred embodiments. This makes the flat adhesive tape become a flat adhesive tape 300 with easy tearing off property, as shown in FIG. 10. A binder 302 with a safe cutter 304 can be used, instead of the perforations, on the adhesive tapes 400 for easy removal, as shown in FIG. 11. Furthermore, the flat adhesive tape as described can be placed into a flat, rectangular container 500, as shown in FIG. 12.

If the flat adhesive tape is a transparent adhesive tape, then the Trademark of the company or the product can be applied to the surface of the interfacial layer 226. Furthermore, if the adhesive tape has the stiff interfacial layer, for example, a polyester or metal foil layer, no deformation of the adhesive tape will occur even when the flat adhesive tape is almost used up. Therefore, the flat adhesive tape can still be easily used.

Furthermore, the adhesive surface of the adhesive tape can be placed inwardly or outwardly, and is not limited to the embodiments. If the adhesive surface of the adhesive tape is outwardly placed, then the flat adhesive tape can be used to remove lint and dust from clothes or a carpet. The flat adhesive tape also has other benefits; for example, it is easy to find the starting point of the flat adhesive tape due to the adhesion.

Other embodiments of the invention will appear to those skilled in the art from consideration of the specification and practice of the invention disclosed herein. It is intended that the specification and examples be considered as exemplary only, with the true scope and spirit of the invention being indicated by the following claims.

What is claimed is:

1. A process for manufacturing a flat adhesive tape, comprising:

providing a stiff interfacial sheet having a flat and solid form;

surrounding the stiff interfacial sheet with a plurality of adhesive layers with a width so as to form a roll of the adhesive layers with the stiff interfacial sheet positioned on a symmetric plane of the roll, wherein the stiff interfacial sheet has a length slightly longer than a half-length of an innermost circumference of the roll of the adhesive layers; and compressing the roll to form the flat adhesive tape.

2. The process for manufacturing adhesive tape according to claim 1, wherein the adhesive layer comprises an inward adhesive surface, and further comprises providing a film between the adhesive layer and the stiff interfacial sheet.

3. The process for manufacturing adhesive tape according to claim 1, further comprises forming a plurality of perforations on the adhesive tape, wherein the perforations are arranged along a width of the adhesive tape, so that segments of the adhesive tape can be easily torn from the roll.

4. The process for manufacturing adhesive tape according to claim 1, further comprising providing a binder having a safe cutter for further fixing and binding the adhesive tape so that segments of the adhesive tape can be easily torn from the roll.

5. The process for manufacturing adhesive tape according to claim 1, further comprising providing a container with a rectangular and flat form for storing the adhesive tape.

6. The process for manufacturing adhesive tape according to claim 1, wherein the adhesive layer is transparent and the stiff interfacial sheet has a mark located thereon.

7. The process for manufacturing adhesive tape according to claim 1, wherein a width of the adhesive layer is substantially equal to that of the stiff interfacial sheet.

8. The process for manufacturing adhesive tape according to claim 7, wherein the adhesive layer is transparent and the stiff interfacial sheet has a mark located thereon.

9. The process for manufacturing adhesive tape according to claim 7, wherein the adhesive layer has an adhesive surface located facing the stiff interfacial sheet.

10. The process for manufacturing adhesive tape according to claim 9, further comprising a layer of material between the adhesive layer and the stiff interfacial sheet.

11. The process for manufacturing adhesive tape according to claim 10, wherein the layer of material which is selected from the group consisting of paper, clothes, nonwoven, plastic, metal.

12. The process for manufacturing adhesive tape according to claim 7, wherein the adhesive layer has an adhesive surface located apart from the stiff interfacial sheet.

13. The process for manufacturing adhesive tape according to claim 1, wherein the width of the adhesive layer is smaller than that of the stiff interfacial sheet so that a portion of the stiff interfacial sheet extends out from the adhesive layer, wherein the extended portion of the stiff interfacial sheet is adapted for marking.

14. The process for manufacturing adhesive tape according to claim 13, wherein the adhesive layer has an adhesive surface facing the stiff interfacial sheet.

15. The process for manufacturing adhesive tape according to claim 14, further comprising providing a layer of material between the adhesive layer and the stiff interfacial sheet.

16. The process for manufacturing adhesive tape according to claim 15, wherein the layer of material which is selected from the group consisting of paper, clothes, nonwoven, plastic, metal.

17. The process for manufacturing adhesive tape according to claim 13, further comprising an adhesive surface apart from the stiff interfacial sheet.

18. A process for manufacturing a flat adhesive tape, comprising:
  providing a stiff interfacial sheet having a flat and solid form;
  surrounding the stiff interfacial sheet with a plurality of adhesive layers with a width so as to form a roll of the adhesive layers with the stiff interfacial sheet positioned on a symmetric plane of the roll;
  providing a layer of high adhesion material containing uncured high cross-linking epoxy or uncured high cross-linking cyanoacrylate between the stiff interfacial sheet and the adhesive layers;
  compressing the roll of the adhesive layers; and
  curing the high adhesion material to form the flat adhesive tape.

19. The process for manufacturing adhesive tape according to claim 18, wherein the adhesive layer has an inward adhesive surface, and further comprises providing a film between the adhesive layer and the layer of high adhesion material.

20. The process for manufacturing adhesive tape according to claim 18, further comprises forming a plurality of perforations on the adhesive tape, wherein the perforations located along a width of the adhesive tape so that segments of the adhesive tape can be easily removed.

21. The process for manufacturing adhesive tape according to claim 18, further comprising providing a binder having a safe cutter for further fixing and binding the adhesive tape and so that segments of the adhesive tape can be easily removed.

22. The process for manufacturing adhesive tape according to claim 18, further comprising providing a container with a rectangular and flat form for storing the adhesive tape.

23. The process for manufacturing adhesive tape according to claim 18, wherein the adhesive layer is transparent and the stiff interfacial sheet has a mark located thereon.

24. The process for manufacturing adhesive tape according to claim 18, wherein a width of the adhesive layer is substantially equal to that of the stiff interfacial sheet.

25. The process for manufacturing adhesive tape according to claim 24, wherein the adhesive layer has a transparent property and the stiff interfacial sheet has a mark located thereon.

26. The process for manufacturing adhesive tape according to claim 24, wherein the adhesive layer has an adhesive surface located facing the stiff interfacial sheet.

27. The process for manufacturing adhesive tape according to claim 26, further comprising providing a layer of material between the adhesive layer and the stiff interfacial sheet.

28. The process for manufacturing adhesive tape according to claim 27, wherein the layer of material is selected from the group consisting of paper, clothes, nonwoven, plastic, metal.

29. The process for manufacturing adhesive tape according to claim 24, wherein the adhesive layer has an adhesive surface located apart from the stiff interfacial sheet.

30. The process for manufacturing adhesive tape according to claim 18, wherein a width of the adhesive layer is smaller than that of the stiff interfacial sheet so that a portion of the stiff interfacial sheet extends out from the adhesive layer, wherein the extended portion of the stiff interfacial sheet is adapted for marking.

31. The process for manufacturing adhesive tape according to claim 30, wherein the adhesive layer has an adhesive surface facing the stiff interfacial sheet.

32. The process for manufacturing adhesive tape according to claim 31, further comprising providing a layer of material between the adhesive layer and the stiff adhesive layer.

33. The process for manufacturing adhesive tape according to claim 32, wherein the layer of material is selected from the group consisting of paper, clothes, nonwoven, plastic, metal.

34. The process for manufacturing adhesive tape according to claim 30, further comprising an adhesive surface apart from the stiff interfacial sheet.

35. A process for manufacturing a flat adhesive tape, comprising:
  providing a plurality of multi-layered adhesive tapes in the form of a roll;
  arranging the multi-layered adhesive tapes in a row;
  inserting a stiff interfacial sheet having a flat and solid form into a central space within each roll of the multi-layered adhesive tapes;
  providing a layer of high adhesion material containing uncured high cross-linking epoxy or uncured high cross-linking cyanoacrylate between the stiff interfacial sheet and the multi-layered adhesive tapes;
  compressing the multi-layered adhesive tapes; and
  curing the high adhesion material to form the flat adhesive tape.

36. The process for manufacturing adhesive tape according to claim 35, further comprising a layer of material between the innermost adhesive surface of the tape and the surface of high adhesion material layer.

37. The process for manufacturing adhesive tape according to claim 36, wherein the layer of material which is selected from the group consisting of paper, clothes, nonwoven, plastic, metal.

38. A process for manufacturing a flat adhesive tape, comprising:
  forming a roll of adhesive tape having a symmetric plane in the center of the roll;
  placing a high adhesion material containing uncured high cross-linking epoxy or uncured high cross-linking cyanoacrylate into the symmetric plane in the center of the roll;
  compressing the roll along its radial direction; and
  curing the high adhesion material so as to form the flat adhesive tape.

* * * * *